United States Patent
Graas et al.

Patent Number: 5,198,047
Date of Patent: Mar. 30, 1993

[54] WINTER TYPE TIRE TREAD

[75] Inventors: Maurice Graas, Reichlange, Belgium; Jan H. Van Tuyl, Ettelbruck, Netherlands

[73] Assignee: The Goodyear Tire & Rubber Company, Akron, Ohio

[21] Appl. No.: 612,366

[22] Filed: Nov. 14, 1990

[51] Int. Cl.$^5$ .............................................. B60C 11/06
[52] U.S. Cl. .......................... 152/209 R; 152/DIG. 3
[58] Field of Search ........ 152/209 R, 209 D, DIG. 3; D12/146, 147

[56] References Cited

U.S. PATENT DOCUMENTS

| D. 294,134 | 2/1988 | Graas | D12/146 |
| D. 316,387 | 4/1991 | Evomaki | D12/147 |
| 4,947,911 | 8/1990 | Ushikubo et al. | 152/209 R |

FOREIGN PATENT DOCUMENTS

| 385953 | 11/1987 | Australia. | |
| 0064934 | 11/1982 | European Pat. Off. | 152/209 R |
| 0160541 | 11/1985 | European Pat. Off. | |
| 0330644 | 8/1989 | European Pat. Off. | |
| 3738159 | 5/1988 | Fed. Rep. of Germany. | |

OTHER PUBLICATIONS

"Mechanics of Pneumatic Tires"; Editor Samuel Clark; 1981; pp. 350–353.
"Gummibereifung"; Oct. 1990, pp. 65, 66, 68.
"Gummibereifung"; Oct. 1980; pp. 60–61.

*Primary Examiner*—Michael W. Ball
*Assistant Examiner*—Nancy T. Krawczyk
*Attorney, Agent, or Firm*—T. P. Lewandowski

[57] ABSTRACT

A winter type tire tread (11) comprises an uneven number of, but at least three, circumferentially extending axially spaced grooves (4–6) and a plurality of zig-zag shaped grooves (36, 37) disposed circumferentially about the tire in a repetitive manner and extending across the tread from the equatorial plane (EP) towards the lateral edges (TE$_1$, TE$_2$) of the tire. The zig-zag shaped grooves (36, 37) situated on one side of the equatorial plane (EP) are symmetrical to those situated on the opposite side of the equatorial plane. The circumferentially and laterally extending grooves (4–6, 36, 37) define block elements (20–23), arranged in circumferentially extending rows (30–33) and having each at least in part the shape of a parallelogram. A plurality of sipes (15) are incorporated in each block element.

9 Claims, 3 Drawing Sheets

WINTER TYPE TIRE TREAD

The present invention relates to directional winter type tire treads as well as to pneumatic radial tires comprising such a tread. A tire having a directional tread is a tire having properties, such as aquaplaning behavior, traction or handling, which depend on its direction of rotation.

The tread portion of a pneumatic tire generally comprises a plurality of grooves defining ground engaging rubber elements. The particular size and shape of these elements contribute significantly to the overall performance of the tire. Tires designed to provide excellent winter performance have wide grooves so as to provide a number of upstanding isolated blocks standing out like teeth which are intended to press into snow. In order to improve the grip of the tire on ice covered roads, the elastomeric blocks are provided with a plurality of sipes. The achievement of excellent properties on roads covered with snow or ice is however obtained at the cost of a reduction of other performance characteristics of the tire, such as handling on dry and braking on wet roads. Moreover the isolated blocks often generate on dry roads a noise level which exceeds the latest standards on tire noise emission.

The aim of the invention is to create a directional winter type tire tread having good braking and cornering properties on wet surfaces as well as low and regular wear.

A further aim of the invention is to provide a tire having a low noise emission.

A still further aim of the invention is to provide a pneumatic tire behaving in a uniform manner, irrespective of the road surface conditions.

These aims are met by the directional winter type tire tread according to the invention comprising an elastomeric substance extending circumferentially about the axis of rotation of the tire, said tread having:

a pair of shoulders which flank the lateral edges of a ground engageable surface;

an uneven number of, but at least three, circumferentially extending axially spaced straight grooves;

a plurality of zig-zag shaped grooves disposed circumferentially about the tire in a repetitive manner and extending across the tread from the equatorial plane EP towards the lateral edges of the tire, the zig-zag shaped grooves situated on one side of the equatorial plane being substantially symmetrical to those situated on the opposite side of the equatorial plane, each zig-zag shaped groove having a first leg, originating in a circumferentially extending center groove, and every second leg substantially coincident with the respective circumferentially extending groove, apart from the shouldermost legs, the centerlines of the different legs forming with the equatorial plane angles having a magnitude below or equal to 80°, apart from the centerlines of the shouldermost legs which have magnitudes ranging between 90° and 100°, said circumferentially extending and laterally extending grooves defining block elements, arranged in circumferentially extending axially innermost center rows and axially outermost shoulder rows; and a plurality of sipes included in each block element each sipe having a first, a second and a middle portion connecting them, the first portion entering the footprint of the tire before the middle and the second portion, the second portion leaving the footprint of the tire after the first and middle portion.

To acquaint persons skilled in the art most closely related to the instant invention, certain preferred embodiments are now described with reference to the annexed drawings. These embodiments are illustrative and can be modified in numerous ways within the spirit and scope of the invention defined in the claims.

For the purpose of this invention, a pneumatic radial tire shall be considered a tire wherein the cords of the carcass reinforcement which extend from bead to bead are laid at cord angles between 75° and 90° with respect to the equatorial plane (EP) of the tire. As used herein and in the claims, an equatorial plane means a plane perpendicular to a tire's axis of rotation and passing through the center of its tread, midway between the sidewalls of the tire. The terms "radial" and "radially" are understood to refer to directions that are perpendicular to the axis of rotation of a tire, the terms "axial" and "axially" are used herein to refer to lines or directions that are parallel to the axis of rotation of a tire and the terms "lateral" and "laterally" are understood to refer to directions going from one sidewall of a tire towards the other sidewall of a tire. "Groove" means an elongated void area in a tread that may extend circumferentially or laterally in the tread in a straight, curved or zig-zag manner. A "sipe" is a groove having a width in the range from about 0.2% to 0.8% of the tread width. Sipes are typically formed by steel blades inserted into a cast or machined mold; inasmuch as sipes are so narrow, they are illustrated by single lines. "Tread width" (TW) is defined as the greatest axial distance across a tread, when measured from a footprint of a tire, when mounted on the design rim and subjected to a specified load and when inflated to a specified inflation pressure for said load. Axial widths and other widths of other tread features or components are measured under the same condition as the tread width. BY "footprint" is meant the contact patch or area of contact of the tire tread with a flat surface under normal load, pressure and speed conditions.

It is to be understood that the invention applies to new tires, to retreaded tires as well as to tire treads in strip form being at least partly vulcanized and having a pattern of grooves and raised elements integral therewith.

Figure 1:
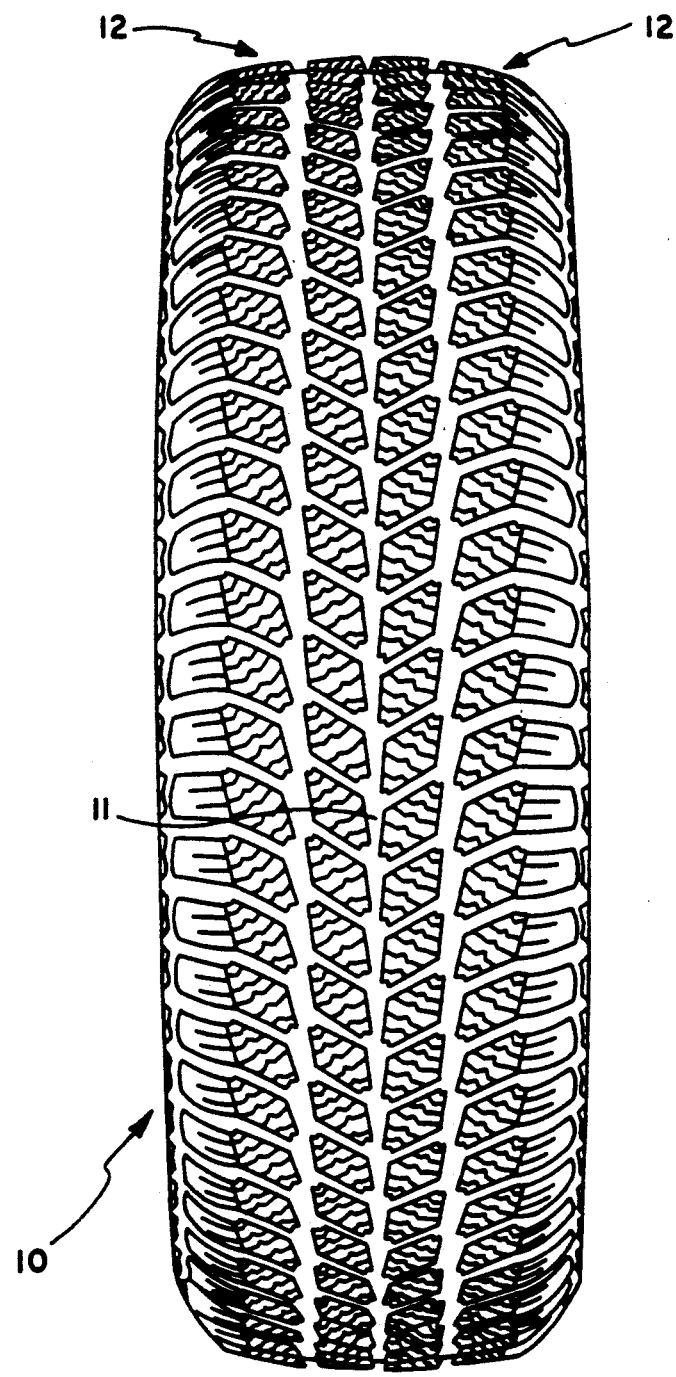
FIG. 1 is a front view of a tire embodying a tread made in accordance with the invention.
Figure 2:
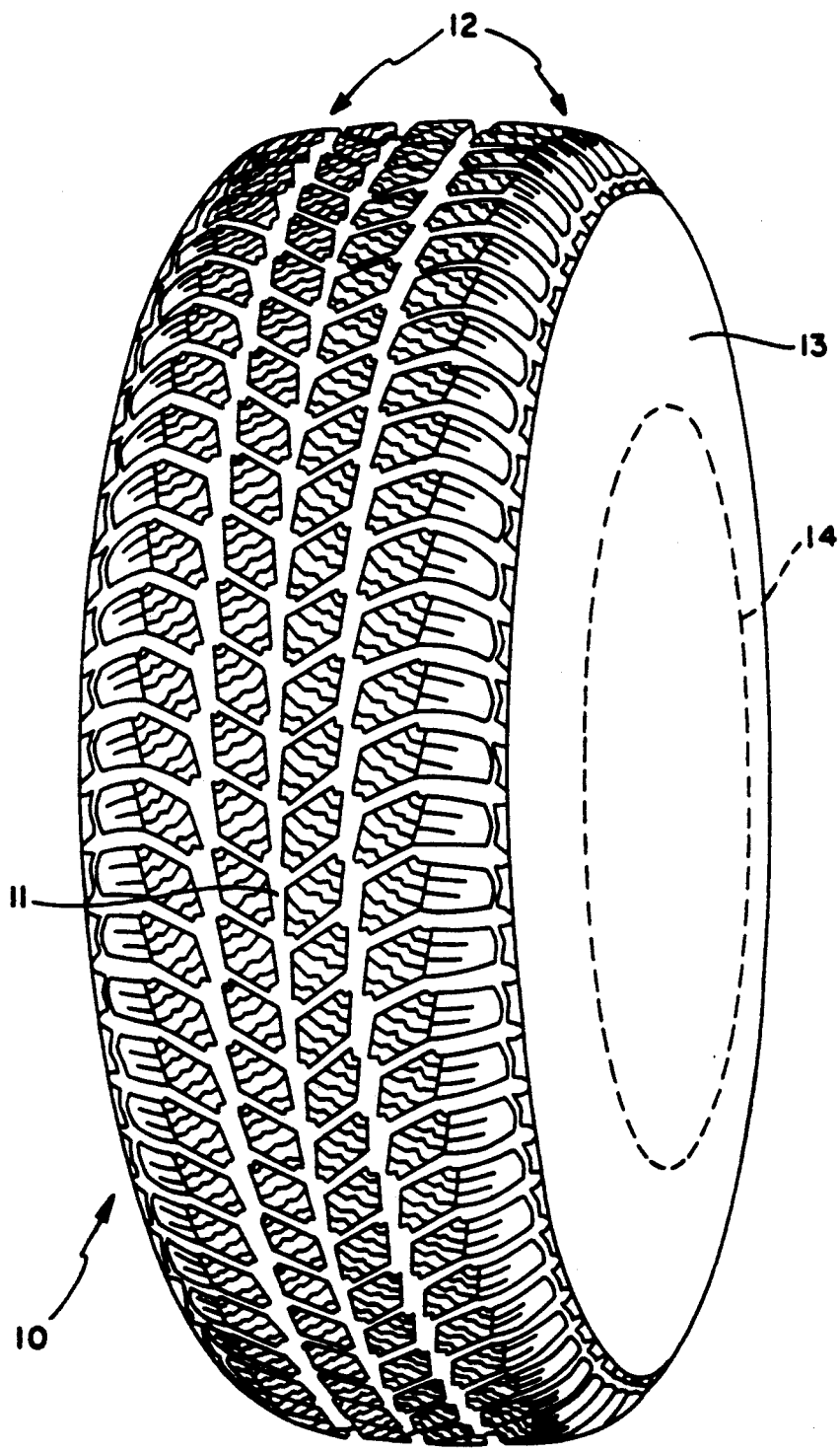
FIG. 2 is a perspective view of the tire shown on FIG. 1.

With reference to FIGS. 1 and 2 there is illustrated a pneumatic tire 10 having a ground contacting tread 11. The treads are flanked by a pair of shoulders 12 which are in turn joined to a pair of sidewalls 13 that extend radially inwardly from the tread and each terminates in a bead 14.

Figure 3:
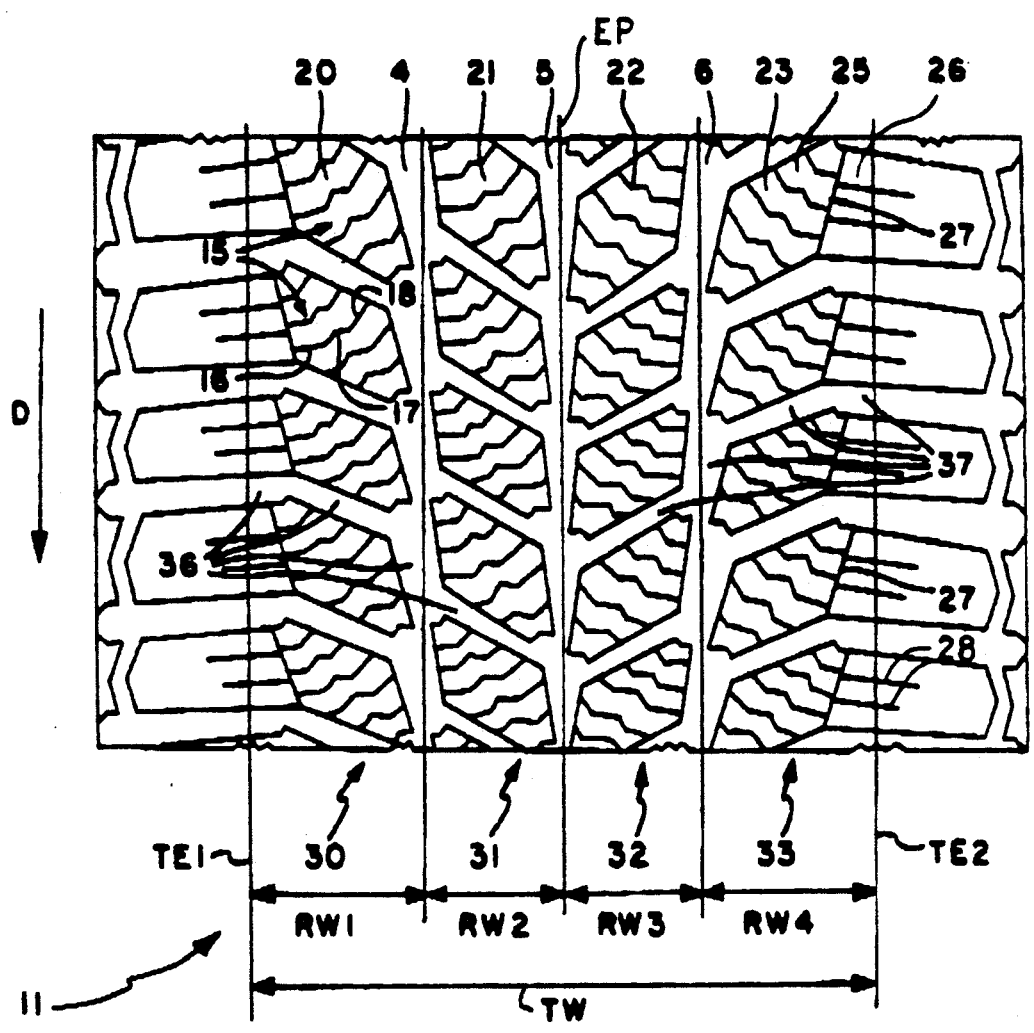
FIG. 3 is an enlarged fragmentary view of a portion of the tread of FIG. 1.

Referring now more specifically to FIG. 3, there is represented an enlarged fragmentary view of the tread of the tire shown in FIGS. 1 and 2. The tread 11 has three circumferentially extending straight grooves 4-6 therein, spaced axially apart across the surface of the tread and dividing the tread into four circumferentially extending rows 30-33 (hereinafter respectively referred to as central rows 31, 32 and shoulder rows 30, 33) of elastomeric blocks 20-23. By circumferentially extending "straight groove" is meant a groove for which the groove edges at the outer surface of the tread are disposed such that a plane which is perpendicular to the axis of rotation of the tire could be located between said groove edges without intersecting any edge of the groove; that is to say the groove edges need not be parallel to one another, neither need the centerline of the groove be straight in order for a circumferentially extending groove to be a straight groove.

As measured in a tire footprint, the axial widths RW1-RW4 of the central and of the shoulder rows, delimited by the axial mean position of the centerline of the bordering circumferentially extending straight grooves, range respectively from about 20% to 25% and 25% to 30% of the tread width TW of the ground engaging portion.

A plurality of zig-zag shaped grooves 36, 37 extend across the tread 11 from the equatorial plane EP towards respectively the lateral edges $TE_1$ and $TE_2$ of the tire. The zig-zag shaped grooves situated on one side of the equatorial plane are substantially symmetrical to those situated on the opposite side of the equatorial plane, the plane of symmetry being the equatorial plane, the plane of symmetry being the equatorial plane. It is however preferred to circumferentially offset zig-zag shaped grooves situated on opposite sides of the equatorial plane. The laterally extending grooves 36, 37 are disposed circumferentially about the tire in a repetitive manner, their widths and inclinations depending on the pitch variation, as is practiced in the industry for tire noise reduction. In the preferred embodiments represented in the figures, the laterally extending zig-zag grooves 36, 37 have each four legs. Each zig-zag groove has a first leg, originating in the circumferentially extending center groove; a second leg, substantially coincident with the respective circumferentially extending groove; and a third and fourth leg. The centerlines of the first, second and third leg form with the equatorial plane angles having a magnitude below 85°; the different angles ranging respectively between 50° and 70°; 5° and 20°; 60° and 80° on one side of the equatorial plane and angles ranging respectively between −50° and −70°; −5° and −20°; and −60° and −80° on the other side of the equatorial plane. The centerlines of the fourth leg form with the equatorial plane angles having a magnitude comprised between 90° and 100°; such an inclination is important because it provides a higher axial stiffness in the shoulders than in the central part of the tire, so as to improve handling. In a preferred embodiment of the invention, the widths of the first, second, third and fourth leg range respectively between 2% and 4%; 4% and 9%; 3% and 6%; 4% and 8% of the tread width TW, as measured in a tire footprint. The groove widths are measured perpendicular to the centerline of the groove.

It is understood that the exact number of circumferentially extending grooves and of laterally extending zig-zag grooves may vary in accordance with the size of a tire. A minimum of three circumferentially extending grooves is, however, considered important to obtain a tread having the required properties. The number of laterally extending grooves 36, 37 on either side of the equatorial plane is preferably in the range of 60 to 80. The exact number of grooves depends upon the size of the tire. For example a tire of size 175/70 R 13 has 3 circumferentially extending zig-zag grooves and 136 laterally extending grooves.

The circumferentially and laterally extending grooves define block elements 20-23, having in a row substantially the same geometric shape. The block elements of the central rows have, in a front view of the tire, the shape of a parallelogram with a large and a small diagonal. The large diagonal of a parallelogram situated on one side of the equatorial plane, forms with the equatorial plane an angle comprised between 30° and 60° and an angle comprised between −30° and −60° if situated on the opposite side of the equatorial plane. If there are five or more circumferentially extending grooves defining four or more central rows of block elements, the magnitudes of the angles formed by the large diagonal with the equatorial plane increases as the parallelograms are in a row more closely situated towards the nearest tread edge.

In a preferred embodiment the block elements 20, 23 of the shoulder rows 30, 33 comprise each two portions, an axially innermost main portion 25 and an axially outermost shoulder portion 26. The main portion 25 has substantially the same geometric aspect as the block elements 21 or 22 of the central rows 31 respectively 32, i.e. the shape of a parallelogram. The shoulder portion 26 is separated from the main portion 25 by a sipe 27 defining one of its four sides, the remaining three sides being delimited by the tread edge, $TE_1$ or $TE_2$, and by the fourth legs of two adjacent laterally extending grooves 36 or 37. The sipe 27 can have a depth equal or lower than the depth of the adjacent laterally extending grooves 36 or 37, a depth of about half the depth of the adjacent laterally extending grooves being preferred. The axially outermost parts of the shoulder portions 26 extend past the tread edges $TE_1$ or $TE_2$ into the sidewalls 13 but have mainly an appearance or aesthetic function. It is to be understood that providing the shoulder blocks 23 with an extra shoulder portion 26 confers a high lateral stiffness to the tire thread, improving thereby handling and that a tire tread comprising only parallelogram shaped block elements has still good winter properties.

In a preferred embodiment, the acute angles of the parallelograms are cut off. This feature, together with the inclination of the sides of the parallelograms bordering the circumferentially extending grooves 4-6 relatively to the equatorial plane, provides additional traction on snow and ice.

The grooves are arranged on the tread, so that the total area of grooves to the total area of interposed blocks is substantially equal on each side of the equatorial plane. In this particular embodiment the total areas of the block portions are equal to about 65% of the tread surface.

Winter type tires as well as all season type tires usually have multiple sipes with a radial depth comparable to the radial depth of the grooves surrounding the respective blocks or a somewhat smaller radial depth. The depth may also be variable. The sipes increase the number or kerf edges. The local high pressure at each kerf edge improves the wiping and digging action of the tread surface, conferring to a tire excellent traction on snow and ice. The relative longitudinal sliding between the two opposite faces of a sipe weakens, however, the resistance of the blocks to flexing in the contact area between tread and ground. This flexing of the blocks leads to diminished handling performance on dry ground and to reduced braking performance on wet ground. Furthermore, the reduced pattern stiffness leads to a reduced resistance to wear.

One important aspect of the invention consists in designing the sipes so as to take advantage of the increased traction they provide on ice and snow and to reduce the negative effect they have on wet braking, cornering properties and tire wear.

Reverting now to FIG. 3, where the direction of rotation of the tire is marked by the arrow D. The different elastomeric blocks 21, 22 of the central rows 31, 32 as well as the main portions 25 of the elastomeric blocks of the shoulder rows 30, 33 are each provided with a plurality of sipes 15 extending from the upper or wearing surface of the tread towards the tire interior. The sipes have a first, a middle and a second portion 18, 17 and 16. The first and second portions 18, 16 intersect the sides of the elastomeric blocks. The first portion enters the footprint of the tire before the middle and the second portion, the second portion leaving the footprint of the tire after the first and middle portion. The first portions 18 of the different sipes form with the footprint edge when entering the footprint of the tire an angle below 45° and preferably below 30°. The second portions 16 of the different sipes form with the footprint edge when leaving the footprint of the tire an angle about 45° and preferably above 60°. The middle portions 17 have a zig-zag shape.

The inclinations of the different first and second portions have been chosen in accordance with the teaching disclosed in commonly owned, co-pending patent application Ser. No. 07/612,953, filed on the same day, now abandoned. According to that disclosure, each first portion 18 of the sipe should form with the front edge of the footprint of the tire, when entering the footprint, an angle of at most 40° preferably of at most 20°. When leaving the footprint of the tire, the second portion 16 of the sipe should form with the rear edge an angle of at least 50° and preferably of at least 70°. Such an inclination is also favorable to an optimal circumferential wiping and digging action of the sipe during its stay in the footprint of the tire. Furthermore, the second portion of the sipe should point towards the nearest tread edge. It is believed that sipes having such an inclination with respect to the nearest tread edge confer to the tread an excellent cornering performance.

Said inclinations of the first and second portion 18, 16 of the sipes are in the instant tread layout subject to fine tuning with a view to the parallelogram shaped elastomeric blocks, to the inclination of the front and rear sides of the blocks with respect to the equatorial plane of the tire and regular tread wear. In order to obtain the required lateral and circumferential stiffness, as well as a good wear resistance of the blocks, the inclination of the first and second portions of neighboring sipes changes progressively so as to maintain the angle, which is formed by the sipe edges and the flanking block sides, substantially constant.

The shoulder portions 26 of the shoulder block elements 20, 23 comprise at least one, preferably two sipes 28, originating in the sipe 27, separating the shoulder portion 26 from the main portion 25, and extending parallel to the adjacent fourth legs of the laterally extending grooves 36, 37 beyond the tread edges $TE_1$ or $TE_2$, into the sidewall. In a preferred embodiment, the sipes 28 in the shoulder portions 26 have a depth which varies between half the depth of the adjacent grooves, near the main portion 25 and the tread edge $TE_1$ or $TE_2$, up to full depth between.

Example: A steel belted radial carcass tire of size 175/70 R 13 has a tread width of about 130 mm and the rows of blocks have axial widths RW1 and RW2 of about 36 and 29 mm respectively. The pitch ratios are 18, 21 and 25 and the tread includes 68 circumferentially spaced pitches.

The grooves have radial depths of about 8.3 mm and their widths depend on the axial position of the different grooves in the tread and they depend also on the pitch variation. The laterally extending zig-zig grooves have their widths ranging between about 4 and 9 mm.

There are five sipes in each parallelogram shaped block and they are located and oriented as shown on FIG. 3, their radial depths being substantially equal to 70% of the radial depths of the surrounding grooves. The depth of the sipe 27 separating the main portion 25 from the shoulder portion 26 of the blocks of the shoulder rows 30, 33 is about 50% of the radial groove depth.

The single carcass ply comprises polyester reinforcement cords. The belt structure comprises two single cut plies reinforced by $2 \times 0.25$ mm steel cords, having a density of about 20 end per inch and forming angles of about 22° with the equatorial plane, the angles of the cables in different plies extending in opposite directions.

The tread comprises an elastomeric compound having a modulus ranging between 5 and 7 MPa, a Shore A harness ranging between 53 and 60, an elongation of about 600% and a tensile strength ranging between 15 and 20 MPa.

While certain representative embodiments have been described for the purpose of illustrating the invention, it will be apparent to those skilled in the art that various changes and modifications may be made therein without departing from the spirit or scope of the invention.

We claim:

1. A tread for a directional winter type tire comprising an elastomeric substance extending circumferentially about the axis of rotation of the tire, said tread having:
    a pair of shoulders which flank the lateral edges of a ground engageable surface;
    an uneven number of, but at least three, circumferentially extending axially spaced straight grooves;
    a plurality of zig-zag shaped grooves disposed circumferentially about the tire in a repetitive manner and extending across the tread from the equatorial plane EP towards the lateral edges of the tire, the zig-zag shaped grooves situated on one side of the equatorial plane being substantially symmetrical to those situated on the opposite side of the equatorial plane, each zig-zag shaped groove having a first leg, originating in a circumferentially extending center groove, and every second leg substantially coincident with the respective circumferentially extending groove, apart from the shouldermost legs, the centerlines of the different legs forming with the equatorial plane angles having a magnitude below or equal to 80°, apart from the centerlines of the shouldermost legs which have magnitudes ranging between 90° and 100°, said circumferentially extending and zig-zag shaped grooves defining block elements, arranged in circumferentially extending axially innermost center rows and axially outermost shoulder rows;
    a plurality of zig-zag sipes includes in each block element each sipe zig-zag having a straight line first, a straight line second and a middle portion connecting them, the first portion entering the footprint of the tire before the middle and the second portion, the second portion leaving the footprint of the tire after the first and middle portion; and the block elements in the center rows have substantially the shape of a parallelogram, each parallelogram having two acute and two obtuse angles joined respectively by a large and a small diagonal, the large diagonal of the parallelograms forming with the equatorial plane an angle comprised between 30° and 60° on one side of the equatorial plane and an angle comprised between −30° and −60° on the opposite side of the equatorial plane.

2. A tread according to claim 1, wherein the values of said angles increase as the parallelograms are in a row more closely situated towards the nearest tread edge.

3. A tread according to claim 1, wherein the block elements in the shoulder rows comprise each two portions separated by a sipe, an axially innermost main portion having the shape of a parallelogram and an axially outermost shoulder portion having its four sides delimited by said sipe, the nearest tread edge and by the shouldermost legs of two adjacent zig-zag shaped grooves.

4. A tread according to claim 1, wherein the acute angles of the parallelograms are cut off.

5. A tread according to claim 1, wherein the first portions of at least 50% of the sipes form with the front edge of the footprint, when entering the footprint, an angle of at most 30°.

6. A tread according to claim 1, wherein the second portions of at least 50% and of the sipes form with the rear edge of the footprint, when leaving the footprint an angle of at least 60°.

7. A tread according to claim 1, wherein the second portions of at least 50% of the sipes are oriented towards the nearest tread edge.

8. A tread according to claim 1, wherein the middle portions of the sipes are zig-zag or wave shaped.

9. A tread according to claim 1, comprising three circumferentially extending straight grooves, spaced apart axially by a distance ranging between 20% and 30% of the tread width and wherein the centerlines of the first, second and third legs of the zig-zag grooves form angles ranging respectively between 50° and 70°, 5° and 20°; 60° and 80° with the equatorial plane on one side of the equatorial plane and angles ranging respectively between 31 50° and −70°; −5° and −20°; and −60° and −80° with the equatorial plane on the other side of the equatorial plane.

* * * * *